(12) United States Patent
Knoener (10) Patent No.: US 11,845,150 B2
(45) Date of Patent: Dec. 19, 2023

(54) METHODS AND APPARATUS TO PROVIDE WELDING-TYPE POWER AND PREHEATING POWER

(71) Applicant: Illinois Tool Works Inc., Glenview, IL (US)

(72) Inventor: Craig Steven Knoener, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 682 days.

(21) Appl. No.: 16/832,844

(22) Filed: Mar. 27, 2020

(65) Prior Publication Data

US 2020/0346295 A1 Nov. 5, 2020

Related U.S. Application Data

(60) Provisional application No. 62/841,153, filed on Apr. 30, 2019.

(51) Int. Cl.
| | |
|---|---|
| *B23K 9/10* | (2006.01) |
| *B23K 9/095* | (2006.01) |
| *B23K 9/12* | (2006.01) |
| *B23K 9/133* | (2006.01) |
| *B23K 9/173* | (2006.01) |
| *H02M 3/335* | (2006.01) |

(52) U.S. Cl.
CPC .......... *B23K 9/1093* (2013.01); *B23K 9/0953* (2013.01); *B23K 9/1006* (2013.01); *B23K 9/125* (2013.01); *B23K 9/133* (2013.01); *B23K 9/173* (2013.01); *H02M 3/33573* (2021.05)

(58) Field of Classification Search
CPC .. B23K 9/1093; B23K 9/0953; B23K 9/1006; B23K 9/125; B23K 9/133; B23K 9/173; H02M 3/33573
See application file for complete search history.

(56) References Cited

U.S. PATENT DOCUMENTS

| | | | | |
|---|---|---|---|---|
| 5,319,179 | A | * 6/1994 | Joecks | B23K 13/015 219/137 R |
| 2017/0197272 | A1 | 7/2017 | Romenesko | |
| 2018/0099346 | A1* | 4/2018 | Zwayer | B23K 9/125 |
| 2018/0333798 | A1* | 11/2018 | Uecker | B23K 9/235 |
| 2018/0354052 | A1* | 12/2018 | Schartner | B23K 9/1006 |

\* cited by examiner

*Primary Examiner* — Brian W Jennison
(74) *Attorney, Agent, or Firm* — McAndrews, Held & Malloy, Ltd.

(57) ABSTRACT

An example welding power supply includes: a power input configured to receive alternating current (AC) input power; and power conversion circuitry configured to: convert a first portion of the input power to welding power; output the welding power to a weld circuit; convert a second portion of the input power to preheating power; and output the preheating power to a preheater.

15 Claims, 7 Drawing Sheets

METHODS AND APPARATUS TO PROVIDE WELDING-TYPE POWER AND PREHEATING POWER

RELATED APPLICATIONS

This patent claims the benefit of U.S. Provisional Patent Application Ser. No. 62/841,153, filed Apr. 30, 2019, entitled "METHODS AND APPARATUS TO PROVIDE WELDING-TYPE POWER AND PREHEATING POWER." The entirety of U.S. Patent Application Ser. No. 62/841,153 is expressly incorporated herein by reference.

BACKGROUND

This disclosure relates generally to welding and, more particularly, to methods and apparatus to convert welding-type power to welding-type power and resistive preheating power.

Welding is a process that has increasingly become ubiquitous in all industries. Welding is, at its core, simply a way of bonding two pieces of metal. A wide range of welding systems and welding control regimes have been implemented for various purposes. In continuous welding operations, metal inert gas (MIG) welding and submerged arc welding (SAW) techniques allow for formation of a continuing weld bead by feeding welding electrode wire shielded by inert gas from a welding torch and/or by flux. Such wire feeding systems are available for other welding systems, such as tungsten inert gas (TIG) welding. Electrical power is applied to the welding wire and a circuit is completed through the workpiece to sustain a welding arc that melts the electrode wire and the workpiece to form the desired weld.

SUMMARY

Methods and apparatus to provide welding-type power and preheating power are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

For the purpose of promoting an understanding of the principles of this disclosure, reference will be now made to the examples illustrated in the drawings and specific language will be used to describe the same. It will nevertheless be understood that no limitation of the scope of the claims is intended by this disclosure. Modifications in the illustrated examples and such further applications of the principles of this disclosure as illustrated therein are contemplated as would typically occur to one skilled in the art to which this disclosure relates.

Systems and methods to provide preheating power and welding power to a welding torch are disclosed herein. In particular, disclosed example systems include a welding-type power source configured to output welding and preheating power to a welding torch for preheating of electrode wire prior to an arc. In some examples, one or more power conversion circuits are included within a single welding power source, which may also include a wire feed assembly, to generate and output both preheating power and welding power from a single power input.

Whereas conventional preheating techniques involved having multiple power sources and/or control circuitry capable of coordinating the preheating and welding outputs for effective welding results, disclosed example systems and methods can reduce the complexity and/or cost involved in performing welding using wire preheating. For example, operators who are converting from a conventional welding-type power source to a welding-type power source that also provides preheating power may benefit from purchasing and using a single power source that is capable of outputting both welding and preheating power.

By providing both welding power and preheating power and, in some examples, wire feeding, from a single power source, disclosed systems and methods enable weld operators to take advantage of the benefits of wire preheating, such as reducing heat input to the weld, increasing deposition, reduce the energy at which the process transitions from globular transfer to spray transfer, and/or reducing hydrogen in the electrode wire and the resulting weld.

As utilized herein the terms "circuits" and "circuitry" refer to physical electronic components (i.e. hardware) and any software and/or firmware (code) that may configure the hardware, be executed by the hardware, and/or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y, and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

As used herein, a wire-fed welding-type system refers to a system capable of performing welding (e.g., gas metal arc welding (GMAW), gas tungsten arc welding (GTAW), submerged arc welding (SAW), etc.), brazing, cladding, hardfacing, and/or other processes, in which a filler metal is provided by a wire that is fed to a work location, such as an arc or weld puddle.

As used herein, a welding-type power source refers to any device capable of, when power is applied thereto, supplying welding, cladding, plasma cutting, induction heating, laser (including laser welding and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith. The terms "power source" and "power supply" are used interchangeably herein.

As used herein, preheating refers to heating the electrode wire prior to a welding arc and/or deposition in the travel path of the electrode wire.

Some disclosed examples describe electric currents being conducted "from" and/or "to" locations in circuits and/or power supplies. Similarly, some disclosed examples describe "providing" electric current via one or more paths, which may include one or more conductive or partially conductive elements. The terms "from," "to," and "providing," as used to describe conduction of electric current, do not necessitate the direction or polarity of the current. Instead, these electric currents may be conducted in either direction or have either polarity for a given circuit, even if an example current polarity or direction is provided or illustrated.

Disclosed example welding power supplies include a power input configured to receive alternating current (AC) input power, and power conversion circuitry. The power conversion circuitry is configured to convert a first portion of the input power to welding power, output the welding power to a weld circuit, convert a second portion of the input power to preheating power, and output the preheating power to a preheater.

Some example welding power supplies further include a rectifier configured to rectify the AC input power, and a preregulator circuit configured to convert the rectified AC input power to intermediate power, in which the first portion and the second portion of the input power are received at the first power conversion circuitry and the second power conversion circuitry as the intermediate power. In some example welding power supplies, the power conversion circuitry includes first power conversion circuitry configured to convert the first portion of the input power to the welding power and output the welding power to the weld circuit, and second power conversion circuitry configured to convert the second portion of the input power to the preheating power and output the preheating power to a preheating circuit. In some examples, the first power conversion circuitry includes a first power converter and a first transformer, and the second power conversion circuitry includes a second power converter and a second transformer.

In some example welding power supplies, the power conversion circuitry includes a rectifier configured to convert the AC input power to a first DC bus having a first DC voltage, first power conversion circuitry configured to convert the first DC voltage to a second DC voltage, second power conversion circuitry configured to convert the second DC voltage to the welding power via at least a first inverter and a first transformer, and to output the welding power to the weld circuit; and third power conversion circuitry configured to convert the second DC voltage to the preheating power via at least a second inverter and a second transformer, and to output the preheating power to the preheater.

Some example welding power supplies further include a first connector configured to output the welding power and a second connector configured to output the preheating power. Some example welding power supplies further include a third connector configured to conduct at least one of the welding power or the preheating power. Some example welding power supplies further include first and second terminals to output the welding power, and a wire feed assembly comprising a contact element configured to be part of the preheater and to conduct the preheating power to an electrode wire fed by the wire feeder. In some examples, the contact element comprises at least one of a feed roller or an idle roller.

Some example welding power supplies further include first and second weld terminals configure to output the welding power, and a wire feed assembly. The wire feed assembly includes a feed roller configured to feed the electrode wire to a third terminal connected to the welding power supply, a first power bus configured to be electrically coupled to a second power bus of the third terminal when the third terminal is connected to the welding power supply, in which the power conversion circuitry configured to output the preheating power via the first power bus and via the first weld terminal or the second weld terminal, and a third power bus configured to be electrically coupled to a fourth power bus of the third terminal when the third terminal is connected to the welding power supply, the wire feed assembly configured to couple the first weld terminal or the second weld terminal to the third power bus to enable output of the weld power to the weld circuit.

In some examples, the power conversion circuitry includes a plurality of switched mode power supplies. In some examples, the preheater includes at least one of: a preheating circuit including a portion of an electrode wire located between a first contact point and a second contact point; an induction coil configured to heat the electrode wire; a tungsten electrode configured to establish an arc to the electrode wire; a laser configured to output energy to the electrode wire; a heating coil configured to heat the electrode wire via radiation; or a convective heating material configured to contact the electrode wire to transfer heat to the electrode wire.

Some example welding power supplies further include control circuitry configured to control the power conversion circuitry to convert the first portion of the input power and the second portion of the input power. In some examples, the control circuitry is configured to determine at least one of the welding power to be output by the power conversion circuitry or the preheating power to be output by the power conversion circuitry based on a welding process parameter. In some examples, the welding process parameter comprises at least one of a workpiece thickness, a workpiece material, a wire material, a wire type, a wire diameter, a gas type, or a total heat input limit. In some examples, the control circuitry is configured to determine at least one of a weld voltage, a weld current, a wire feed speed, an inductance, a weld pulse width, a relative pulse amplitude, a wave shape, a preheating voltage, a preheating current, a preheating pulse, a preheating resistance, or a preheating energy input based on the welding process parameter.

Figure 1:
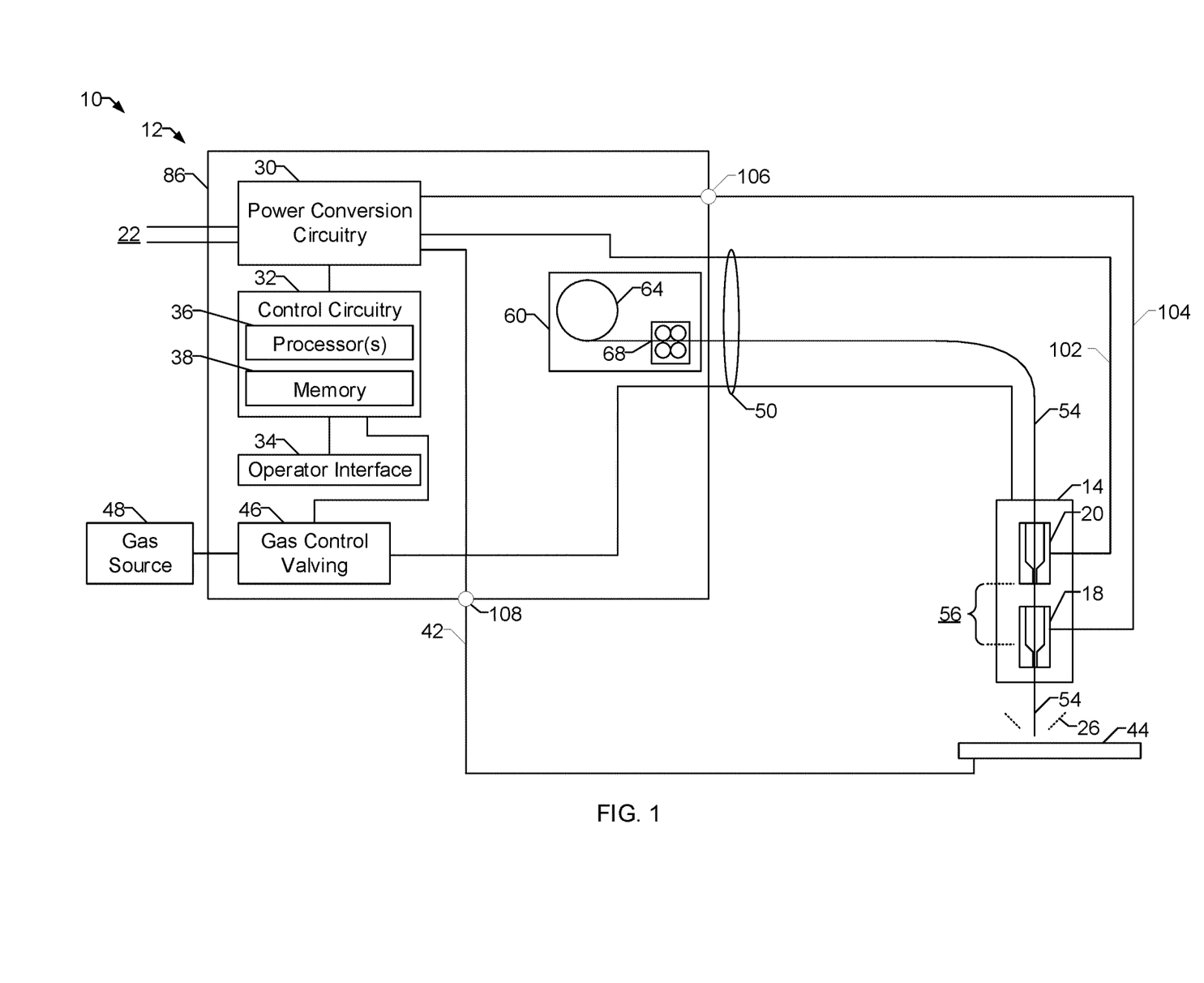
FIG. 1 illustrates an example welding power supply configured to convert input power to welding power and preheating power, in accordance with aspects of this disclosure.

FIG. 1 illustrates an example welding system 10, including a welding power source 12 configured to convert input power to welding power and preheating power. The example welding system 10 of FIG. 1 includes the welding power source 12 and a preheating welding torch 14. The welding torch 14 may be a torch configured for any wire-fed welding process, such as gas metal arc welding (GMAW), flux cored arc welding (FCAW), self-shielded FCAW, and/or submerged arc welding (SAW), based on the desired welding application.

The welding power source 12 converts the input power from a source of primary power 22 to one or both of output welding power and/or preheating power, which are output to the welding torch 14. In the example of FIG. 1, the welding power source also supplies the filler metal to a welding torch 14 configured for GMAW welding, FCAW welding, or SAW welding.

The welding power source 12 is coupled to, or includes, the source of primary power 22, such as an electrical grid or engine-driven generator that supplies primary power, which may be single-phase or three-phase AC power. For example, the welding power source 12 may be an engine-driven welding power source that includes the engine and generator that provides the primary power 22 within the welding power source 12. The welding power source 12 may process the primary power 22 to output welding-type power for output to the welding torch 14 via an torch cable 50.

Power conversion circuitry 30 converts the primary power (e.g., AC power) to welding-type power as either direct current (DC) or AC, and to preheating power. Example preheating power may include DC and/or AC electrical current that provides resistive, or Joule, heating when conducted through a portion of the electrode wire 54. Additional examples of preheating power disclosed herein may include high frequency AC current that provides inductive heating within the electrode wire 54, and/or power suitable for hotwire techniques, arc-based preheating in which an electrical arc is used to apply heat to the wire prior to the welding arc, laser-based preheating, radiant heating, convective heating, and/or any other forms of wire heating. The power conversion circuitry 30 may include circuit elements such as transformers, switches, boost converters, inverters, buck converters, half-bridge converters, full-bridge converters, forward converters, flyback converters, an internal bus, bus capacitor, voltage and current sensors, and/or any other topologies and/or circuitry to convert the input power to the welding power and the preheating power, and to output the welding power and the preheating power to the torch 14. Example implementations of the power conversion circuitry 30 are disclosed below in more detail.

The first and second portions of the input power may be divided by time (e.g., the first portion is used at a first time and the second portion is used at a second time) and/or as portions of the total delivered power at a given time. The power conversion circuitry 30 outputs the welding power to a weld circuit, and outputs the preheating power to a preheating circuit or other preheater. The weld circuit and the preheating circuit may be implemented using any combination of the welding torch 14, a weld accessory, and/or the power source 12.

The power conversion circuitry 30 may include circuit elements such as boost converters. In some examples, the primary power 22 received by the power conversion circuitry 30 is an AC voltage between approximately 110V and 575V, between approximately 110V and 480V, or between approximately 110V and 240V. As used in reference to the input power, the term approximately may mean within 5 volts or within 10 percent of the desired voltage.

The power conversion circuitry 30 may be configured to convert the input power to any conventional and/or future welding-type output. The example power conversion circuitry 30 may implement one or more controlled voltage control loop(s), one or more controlled current control loop(s), one or more controlled power control loops, and/or one or more controlled resistance control loops to control the voltage and/or current output to the welding circuit and/or to the preheating circuit. As described in more detail below, the power conversion circuitry 30 may be implemented using one or more converter circuits, such as multiple converter circuits in which each of the welding-type output and the preheating output is produced using separate ones of the converter circuits.

In some examples, the power conversion circuitry 30 is configured to convert the input power to a controlled waveform welding output, such as a pulsed welding process or a short circuit welding process (e.g., regulated metal deposition (RMD™)). For example, the RMD™ welding process utilizes a controlled waveform welding output having a current waveform that varies at specific points in time over a short circuit cycle.

The welding power source 12 includes control circuitry 32 and an operator interface 34. The control circuitry 32 controls the operations of the welding power source 12 and may receive input from the operator interface 34 through which an operator may choose a welding process (e.g., GMAW, FCAW, SAW) and input desired parameters of the input power (e.g., voltages, currents, particular pulsed or non-pulsed welding regimes, and so forth). The control circuitry 32 may be configured to receive and process a plurality of inputs regarding the performance and demands of the system 10.

The control circuitry 32 includes one or more controller(s) and/or processor(s) 36 that controls the operations of the power source 12. The control circuitry 32 receives and processes multiple inputs associated with the performance and demands of the system. The processor(s) 36 may include one or more microprocessors, such as one or more "general-purpose" microprocessors, one or more special-purpose microprocessors and/or ASICS, one or more microcontrollers, and/or any other type of processing and/or logic device. For example, the control circuitry 32 may include one or more digital signal processors (DSPs). The control circuitry 32 may include circuitry such as relay circuitry, voltage and current sensing circuitry, power storage circuitry, and/or other circuitry, and is configured to sense the primary power 22 received by the power source 12.

The example control circuitry 32 includes one or more memory device(s) 38. The memory device(s) 38 may include volatile and/or nonvolatile memory and/or storage devices, such as random access memory (RAM), read only memory (ROM), flash memory, hard drives, solid state storage, and/or any other suitable optical, magnetic, and/or solid-state storage mediums. The memory device(s) 38 store data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth. The memory device 38 may store machine executable instructions (e.g., firmware or software) for execution by the processor(s) 36. Additionally or alternatively, one or more control schemes for various welding processes, along with associated settings and parameters, may be stored in the memory device(s) 38, along with machine executable instructions configured to provide a specific output (e.g., initiate wire feed, enable gas flow, capture welding current data, detect short circuit parameters, determine amount of spatter) during operation.

The example operator interface 34 enables control or adjustment of parameters of the welding system 10. The operator interface 34 is coupled to the control circuitry 32 for operator selection and adjustment of the welding process (e.g., pulsed, short-circuit, FCAW) through selection of the wire size, wire type, material, and gas parameters. The operator interface 34 is coupled to the control circuitry 32 for control of the voltage, amperage, power, resistance, wire feed speed, and arc length for a welding application. The operator interface 34 may receive inputs using any input device, such as via a keypad, keyboard, buttons, touch screen, voice activation system, wireless device, etc.

The operator interface 34 may receive inputs specifying workpiece thickness, workpiece material, wire material (e.g., steel, aluminum), wire type (e.g., solid, cored), wire diameter, gas type, and/or any other parameters. Upon receiving the input, the control circuitry 32 determines the welding output for the welding application. For example, the control circuitry 32 may determine weld voltage, weld current, wire feed speed, inductance, weld pulse width, relative pulse amplitude, wave shape, preheating voltage, preheating current, preheating pulse, preheating resistance, preheating energy input, and/or any other welding and/or preheating parameters for a welding process based at least in part on the input received through the operator interface 34.

In some examples, the welding power source 12 may include polarity reversing circuitry. Polarity reversing circuitry reverses the polarity of the output welding-type power when directed by the control circuitry 32. For example, some welding processes, such as TIG welding, may enable a desired weld when the electrode has a negative polarity, known as DC electrode negative (DCEN). Other welding processes, such as stick or GMAW welding, may enable a desired weld when the electrode has a positive polarity, known as DC electrode positive (DCEP). When switching between a TIG welding process and a GMAW welding process, the polarity reversing circuitry may be configured to reverse the polarity from DCEN to DCEP.

Additionally or alternatively, the operator may simply connect the torch 14 to the power source 12 without knowledge of the polarity, such as when the torch is located a substantial distance from the power source 12. The control circuitry 32 may direct the polarity reversing circuitry to reverse the polarity in response to signals received through communications circuitry, and/or based on a selected or determined welding process.

In some examples, the power source 12 includes communications circuitry. For example, communications circuitry may be configured to communicate with the welding torch 14, accessories, and/or other device(s) coupled to power cables and/or a communications port. The communications circuitry sends and receives command and/or feedback signals over welding power cables used to supply the welding-type power. Additionally or alternatively, the communications circuitry may communicate wirelessly with the welding torch 14 and/or other device(s).

For some welding processes (e.g., GMAW), a shielding gas is utilized during welding. In the example of FIG. 1, the welding power source 12 includes one or more gas control valves 46 configured to control a gas flow from a gas source 48. The control circuitry 32 controls the gas control valves 46. The welding power source 12 may be coupled to one or multiple gas sources 48 because, for example, some welding processes may utilize different shielding gases than others. In some examples, the welding power source 12 is configured to supply the gas with the welding power and/or the preheating power to the torch 14 via a combined torch cable 50. In other examples, the gas control valves 46 and gas source 48 may be separate from the welding power source 12. For example, the gas control valves 46 may be disposed connected to the combined torch cable 50 via a connector.

The example power source 12 includes a wire feed assembly 60 that supplies electrode wire 54 to the welding torch 14 for the welding operation. The wire feed assembly 60 includes elements such as a wire spool 64 and a wire feed drive configured to power drive rolls 68. The wire feed assembly 60 feeds the electrode wire 54 to the welding torch 14 along the torch cable 50. The welding output may be supplied through the torch cable 50 coupled to the welding torch 14 and/or the work cable 42 coupled to the workpiece 44. As disclosed in more detail below, the preheating output may be supplied to the welding torch 14 (or another via a connection in the wire feed assembly 60), supplied to the welding torch 14 via one or more preheating power terminals, and/or supplied to a preheater within the wire feed assembly 60 or otherwise within a housing 86 of the welding power source 12.

The example power source 12 is coupled to a preheating GMAW torch 14 configured to supply the gas, electrode wire 54, and electrical power to the welding application. As discussed in more detail below, the welding power source 12 is configured to receive input power, convert a first portion of the input power to welding power and output the welding power to a weld circuit, and to convert a second portion of the input power to preheating power and output the preheating power to a preheating circuit or other preheater.

The example torch 14 includes a first contact tip 18 and a second contact tip 20. The electrode wire 54 is fed from the wire feed assembly 60 to the torch 14 and through the contact tips 18, 20, to produce a welding arc 26 between the electrode wire 54 and the workpiece 44. The preheating circuit includes the first contact tip 18, the second contact tip 20, and a portion 56 of the electrode wire 54 that is located between the first contact tip 18 and a second contact tip 20. The example power source 12 is further coupled to the work cable 42 that is coupled to the workpiece 44.

In operation, the electrode wire 54 passes through the second contact tip 20 and the first contact tip 18, between which the power conversion circuitry 30 outputs a preheating current to heat the electrode wire 54. Specifically, in the configuration shown in FIG. 1, the preheating current enters the electrode wire 54 via the second contact tip 20 and exits via the first contact tip 18. However, the preheating current may be conducted in the opposite direction. At the first contact tip 18, a welding current may also enter (or exit) the electrode wire 54.

The welding current is output by the power conversion circuitry 30, which derives the preheating power and the welding power from the primary power 22. The welding current exits the electrode wire 54 via the workpiece 44, which in turn generates the welding arc 26. When the electrode wire 54 makes contact with the workpiece 44, an electrical circuit is completed and the welding current flows through the electrode wire 54, across the metal work piece(s) 44, and returns to the power conversion circuitry 30 via a work cable 42. The welding current causes the electrode wire 54 and the parent metal of the work piece(s) 44 in contact with the electrode wire 54 to melt, thereby joining the work pieces as the melt solidifies. By preheating the electrode wire 54, the welding arc 26 may be generated with drastically reduced arc energy. Generally speaking, the preheating current is proportional to the distance between the contact tips 18, 20 and the electrode wire 54 size.

During operation, the power conversion circuitry 30 establishes a preheating circuit to conduct preheating current through a section 56 of the electrode wire 54. The preheating current flows from the power conversion circuitry 30 to the second contact tip 20 via a first conductor 102, through the section 56 of the electrode wire 54 to the first contact tip 18, and returns to the power conversion circuitry 30 via a second cable 104 connecting the power conversion circuitry 30 to the first contact tip 18. Either, both, or neither of the conductors 102, 104 may be combined with other cables and/or conduits. For example, the conductor 102 and/or the conductor 104 may be part of the cable 50. In other examples, the conductor 104 is included within the cable 50, and the conductor 102 is routed separately to the torch 14. To this end, the power source 12 may include between one and three terminals to which one or more cables can be physically connected to establish the preheating, welding, and work connections. For example, multiple connections can be implemented into a single terminal using appropriate insulation between different connections.

In the illustrated example of FIG. 1, the power source 12 includes two terminals 106, 108 configured to output the welding power to the contact tip 20 and the work cable 42. The conductor 104 couples the terminal 106 to the torch 14, which provides the power from the conductor 104 to the contact tip 20. The work cable 42 couples the terminal 108 to the workpiece 44. The example terminals 106, 108 may have designated polarities, or may have reversible polarities.

Because the preheating current path is superimposed with the welding current path over the connection between the first contact tip 18 and the power conversion circuitry 30 (e.g., via conductor 104), the cable 50 may enable a more cost-effective single connection between the first contact tip 18 and the power conversion circuitry 30 (e.g., a single cable) than providing separate connections for the welding current to the first contact tip 18 and for the preheating current to the first contact tip 18.

The example power source 12 includes a housing 86, within which the control circuitry 32, the power conversion circuitry 30, the wire feed assembly 60, the operator interface 34, and/or the gas control valving 46 are enclosed. In examples in which the power conversion circuitry 30 includes multiple power conversion circuits (e.g., a preheating power conversion circuit and a welding power conversion circuit), all of the power conversion circuits are included within the housing 86.

Figure 2:
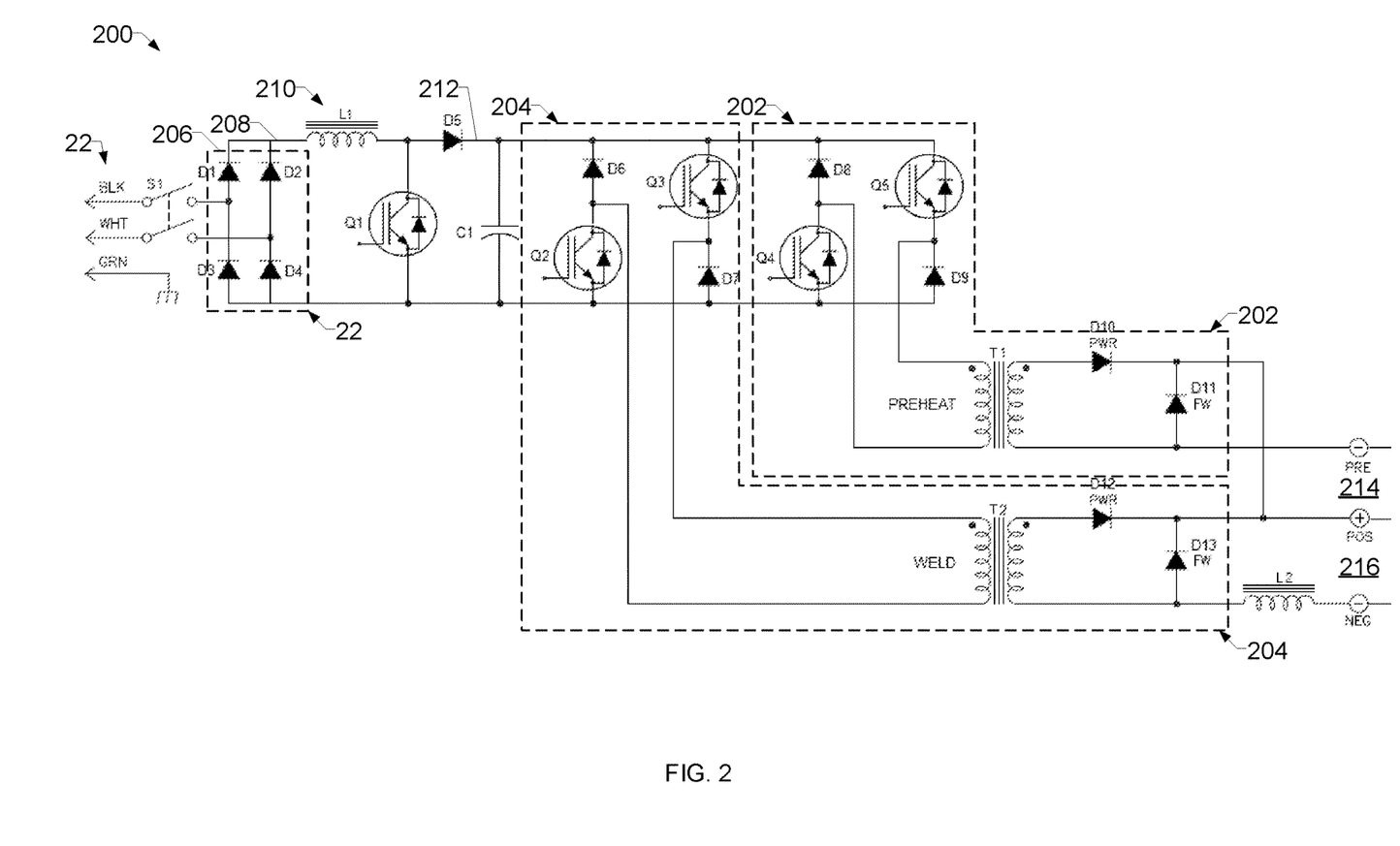
FIG. 2 is a schematic diagram of example power conversion circuitry that may be used to implement the power conversion circuitry of FIG. 1.

FIG. 2 is a schematic diagram of example power conversion circuitry 200 that may be used to implement the power conversion circuitry 30 of FIG. 1 to convert input power to output welding power and preheating power.

The example power conversion circuitry 200 of FIG. 2 includes preheat power conversion circuitry 202 and weld power conversion circuitry 204. The preheat power conversion circuitry 202 and weld power conversion circuitry 204 are both coupled to the primary power 22 as a source of input power. In the example of FIG. 2, the primary power 22 is a single-phase AC power. The power conversion circuitry 200 includes a rectifier 206 that rectifies the AC input power to provide a first DC bus voltage 208.

A boost converter 210 may be used to convert the first DC bus voltage 208 to a desired second DC bus voltage 212. The boost converter 210 may implement a pre-regulator circuit to convert the rectified power (e.g., the first DC bus voltage) to intermediate power (e.g., the second DC bus voltage 212). In other examples, each of the preheat power conversion circuitry 202 and the weld power conversion circuitry 204 may be supplied with a separate DC voltage using separate boost converters, and/or the boost converter 210 may supply separate DC buses (with corresponding energy storage elements) to supply each of the preheat power conversion circuitry 202 and the weld power conversion circuitry 204 with different DC input voltages over different time periods. The preheat power conversion circuitry 202 and the weld power conversion circuitry 204 share the same source of input power (e.g., the primary power 22), even though the input power may be divided between the preheat power conversion circuitry 202 and the weld power conversion circuitry 204 in any appropriate manner.

The preheat power conversion circuitry 202 converts the second DC bus voltage 212 to a preheating output 214, and the weld power conversion circuitry 204 converts the second DC bus voltage 212 to a welding output 216. Each of the example preheating output 214 and the welding output 216 is produced using a separate combination of an inverter and/or a transformer (e.g., a first transformer in the preheat power conversion circuitry 202, a second transformer in the weld power conversion circuitry 204).

The example control circuitry 32 controls the switches Q1, Q2, Q3, Q4, and Q5 in the example preheat power conversion circuitry 202, the example weld power conversion circuitry 204, and the example boost converter 210. By controlling the switches Q1-Q5, the example control circuitry may control the second DC bus voltage 212, the preheating output 214, and/or the welding output 216, to output the preheating output 214 and/or the welding output 216 in accordance with configured preheating parameters (e.g., preheating voltage, preheating current, etc.) and/or configured welding parameters (e.g., welding voltage, welding current, pulse parameters, AC frequency, etc.).

As illustrated in FIG. 2, the example preheat power conversion circuitry 202 and weld power conversion circuitry 204 are each forward converters that convert the first DC bus to an output. While the example preheat power conversion circuitry 202 and the example weld power conversion circuitry 204 are described herein as forward converter circuits, any other topologies may be used to implement either or both of the preheat power conversion circuitry 202 and the weld power conversion circuitry 204, such as switched mode power supplies, full-bridge and/or half-bridge topologies, and/or inverter-based converter circuits.

The control circuitry 32, the operator interface 34, the gas control valving 46, and/or the wire feed assembly 60 may be powered using the preheating output 214, the welding output 216, and/or one or more additional and/or separate power conversion circuits, which may convert portion(s) of the primary power 22.

In some examples, the control circuitry 32 is configured to adjust control of the weld power conversion circuitry 204 to adjust the welding output 216 based on the preheating output, such as to maintain a consistent heat input to the weld and/or increase deposition. For example, the control circuitry 32 may decrease the welding output 216 (e.g., weld voltage and/or the weld current) via the weld power conversion circuitry 204 based on controlling the preheat power conversion circuitry 202 to increase in the preheating output 214.

Figure 3:
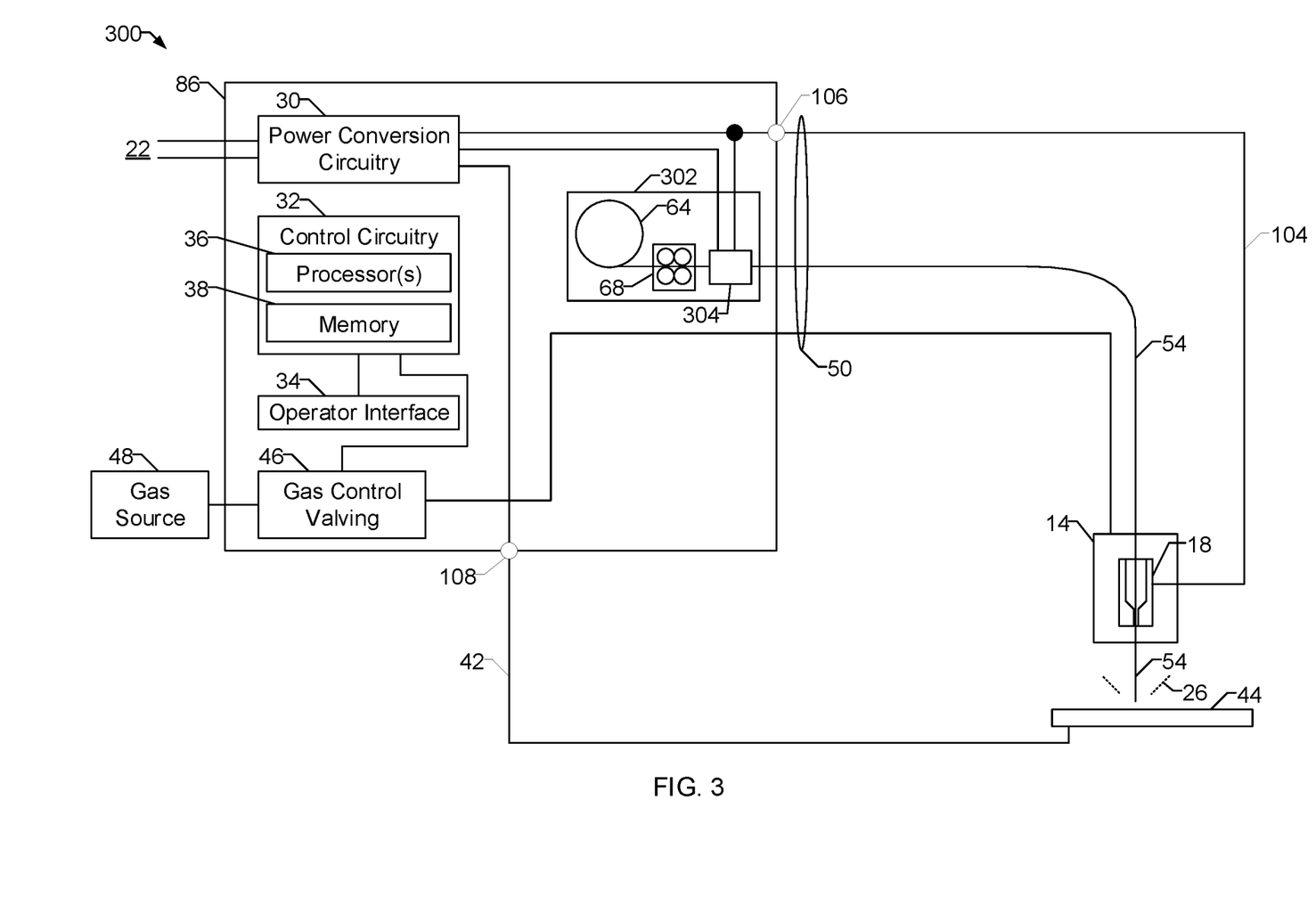
FIG. 3 illustrates another example welding system configured to convert input power to welding power and preheating power, including a wire feed assembly having a preheater within a housing of the welding power supply, in accordance with aspects of this disclosure.

FIG. 3 illustrates another example welding power source 300 configured to convert input power (e.g., the primary power 22) to welding power (e.g., the welding output 216) and preheating power (e.g., the preheating output 214). The example welding power source 300 includes the power conversion circuitry 30, the control circuitry 32, the operator interface 34, the processor(s) 36, the memory 38, the gas control valving 46, the housing 86, and the terminals 106, 108. The example power source 300 receives primary power 22 as input power to the power conversion circuitry 30.

The example welding power source 300 further includes a wire feed assembly 302, which may be similar to the wire feed assembly 60 of FIG. 1. The wire feed assembly 60 includes the wire spool 64, a wire feed drive, and drive rolls 68. The example wire feed assembly 302 further includes a wire preheater 304 (i.e., within the same housing 86 of the welding power source 300 as the power conversion circuitry 30).

In the example of FIG. 3, the power conversion circuitry 30 outputs the preheating output 214 to the wire preheater 304 within the housing 86, such as within the wire feed assembly 302. The example wire preheater 304 may provide any of resistive preheating (e.g., via two contact points on the electrode wire 54, inductive heating of the electrode wire 54 (e.g., via routing the electrode wire 54 through or near an induction coil), arc-based preheating (e.g., via one or more tungsten electrodes configured to establish an electrical arc to the electrode wire 54), laser-based preheating (e.g., via a laser configured to output energy to the welding wire 54), radiant heating (e.g., via heating coils not in contact with the welding wire 54 but configured to heat the welding wire 54 via radiation), convective heating (e.g., via heating coils, ceramic, or other heated material configured to contact the welding wire 54 to transfer heat to the welding wire 54), and/or any other preheating technique. In operation, the example welding power source 300 preheats the electrode wire 54 via the wire preheater 304. The example control circuitry 32 may control the power conversion circuitry 30 as described above with reference to FIGS. 1 and 2.

As an example, the preheater 304 may provide a first contact point instead of the second contact tip 20, such that the portion of the electrode wire 54 that is resistively preheated extends from the preheater 304 to the contact tip 18. The example preheater 304 may be a drive roller or an idle roller of the wire feed assembly 302.

By performing preheating at the power source 300, a standard welding torch may be used by the operator, rather than a torch that includes preheating and/or liquid-cooling apparatus. Thus, performing preheating at the power source 300 may reduce bulk of the torch to be held and manipulated by the operator.

Figure 4:
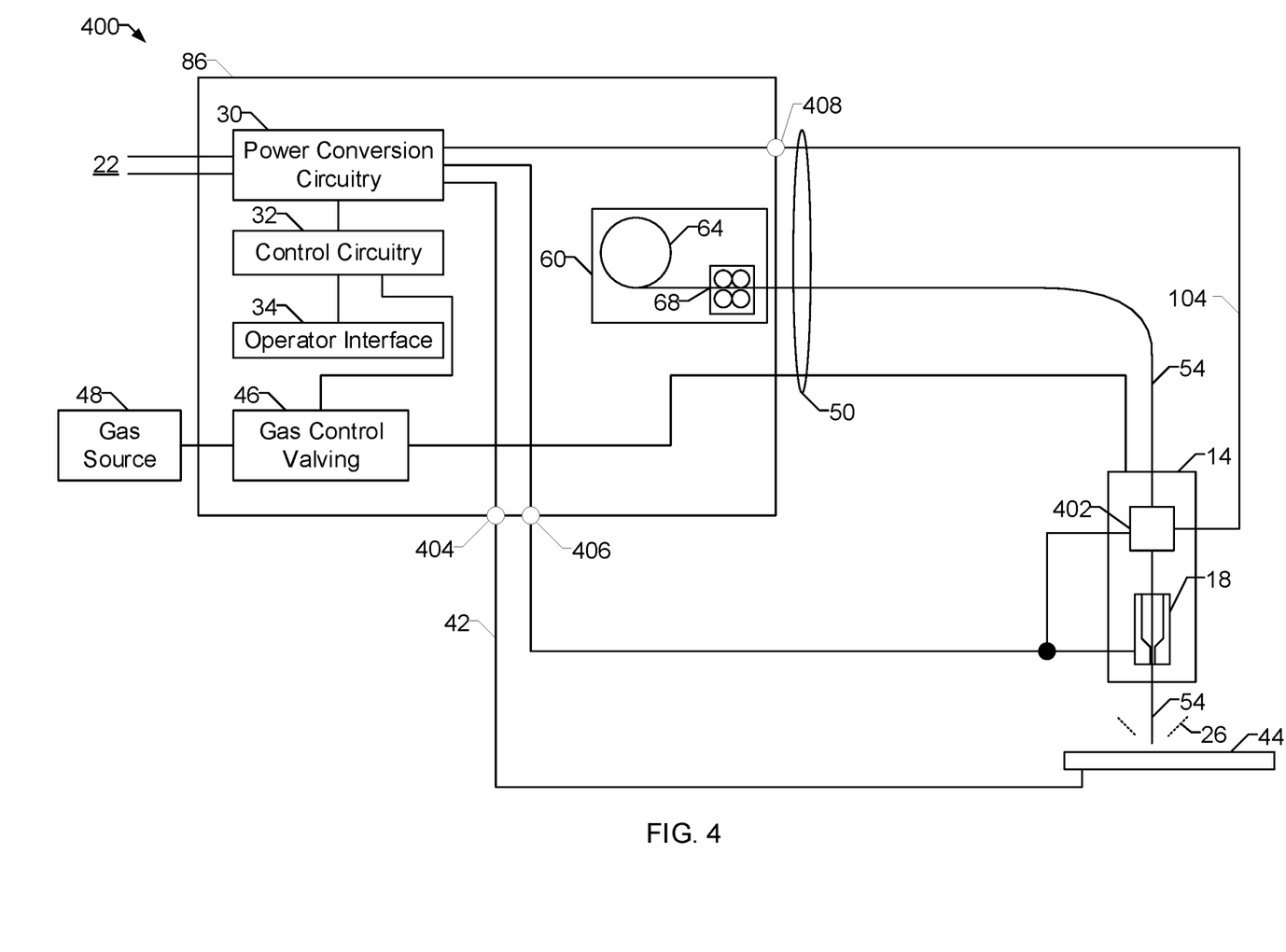
FIG. 4 illustrates another example welding system configured to convert input power to welding power and preheating power, in accordance with aspects of this disclosure.

In other examples, other types of wire preheaters may be included in the preheating torch 14. For example, FIG. 4 is a block diagram of an example welding power source 400 providing preheating power (e.g., the preheating output 314) to a wire preheater 402 in the torch 14. The example welding power source 400 includes the power conversion circuitry 30, the control circuitry 32, the operator interface 34, the processor(s) 36, the memory 38, the gas control valving 46, and the housing 86. The example power source 400 receives primary power 22 as input power to the power conversion circuitry 30.

In the example of FIG. 4, the power conversion circuitry 30 outputs the preheating output 214 to the wire preheater 402 within the torch 14. The example wire preheater 402 may provide any of inductive heating of the electrode wire 54 (e.g., via routing the electrode wire 54 through or near an induction coil), arc-based preheating (e.g., via one or more tungsten electrodes configured to establish an electrical arc to the electrode wire 54), laser-based preheating, radiant heating, convective heating, and/or any other preheating technique. In operation, the example power source 12 preheats the electrode wire 54 via the wire preheater 402 in the torch 14. The example control circuitry 32 may control the power conversion circuitry 30 as described above with reference to FIG. 4.

In some other examples, the wire preheater 402 may be located in (e.g., integrated with or attached to) the cable whip attaching the torch 14 to the wire feeder 16. For example, the cable may be provided with a housing partway along the cable whip, far enough away from the torch body (e.g., the handheld portion of the torch 14) so that the mass of the wire preheater 402 does not substantially affect the manipulation of the torch 14 by the operator during welding operations.

To provide the preheating output 214 and the welding output 216 to the torch 14, the example power source 400 further includes output terminals or connectors 404, 406, 408. The power conversion circuitry 30 outputs the welding output 216 via the terminals 404, 406 to the workpiece 44 and the contact tip 18, and outputs the preheating output 214 via the terminals 406, 408 to the wire preheater 402. The power source 400 may include an additional output terminal for outputting the preheating output 214 instead of using the terminal 406 for both the welding output 216 and the preheating output 214.

Figure 5:
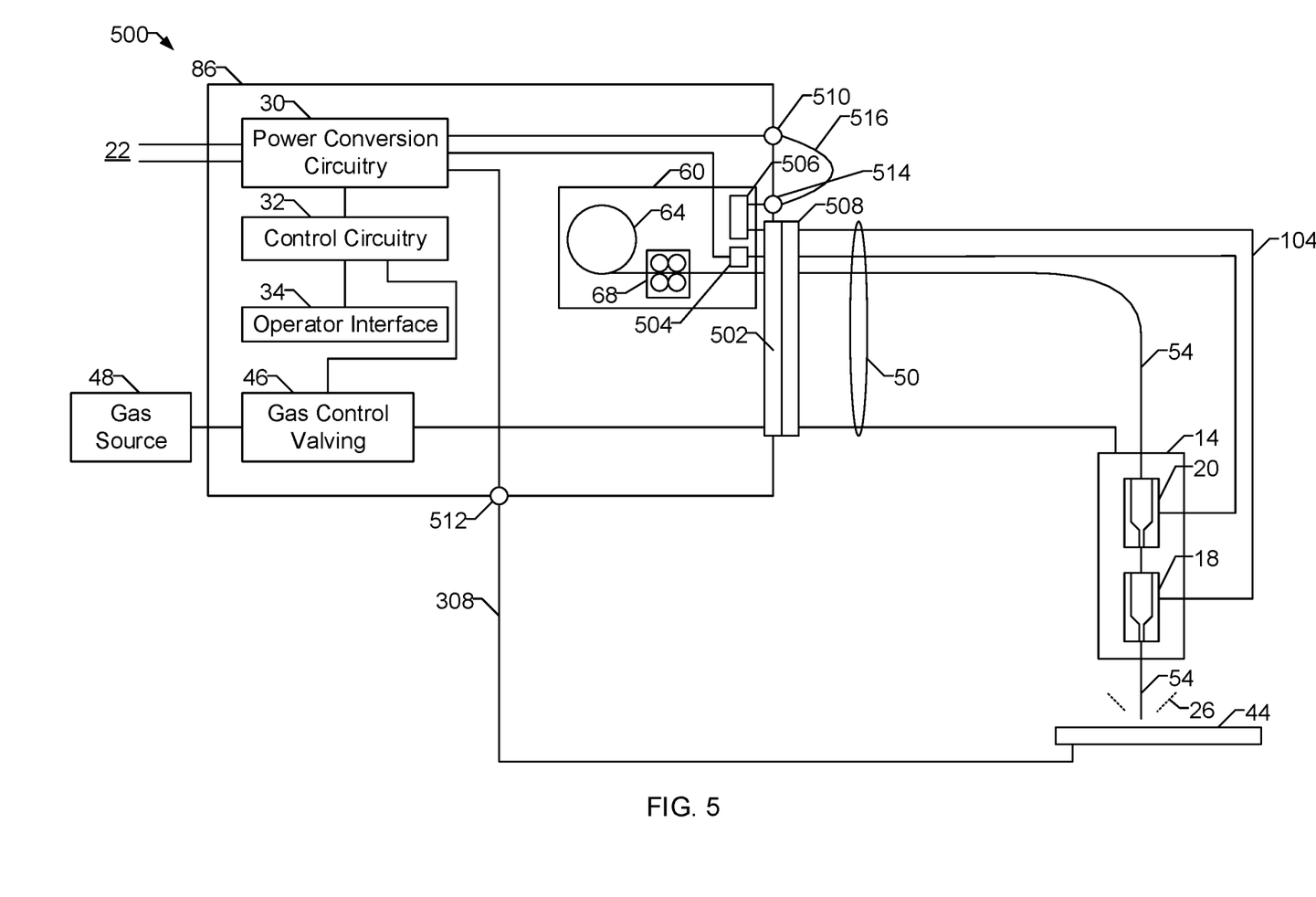
FIG. 5 illustrates another example welding system configured to convert input power to welding power and preheating power, including a power bus configured to be coupled to a welding terminal, in accordance with aspects of this disclosure.

FIG. 5 illustrates another example welding power source 500 configured to convert input power to welding power (e.g., the welding output 216) and preheating power (e.g., the preheating output 214). The example welding power source 500 includes the power conversion circuitry 30, the control circuitry 32, the operator interface 34, the processor(s) 36, the memory 38, the gas control valving 46, and the housing 86. The example power source 500 receives primary power 22 as input power to the power conversion circuitry 30, and outputs the preheating output 214 and the welding output 216 to the contact tips 18, 20 of the preheating welding torch 14.

To connect the torch 14 to the power source 500, the example welding power source 500 further includes a torch terminal 502, a preheating power bus 504, and a welding power bus 506. The torch terminal 502 is configured to receive a complementary torch connector 508 connected via the torch cable 50 to the torch 14. When connected, the torch terminal 502 and the torch connector 508 conduct the preheating output 214 and the welding output 216 to the torch 14. The power source 500 further includes welding output terminals 510, 512. For instance, the power conversion circuitry 30 is configured to output the preheating output 214 via the preheating power bus 504 and the output terminal 510, and is configured to output the welding output 216 via the welding output terminals 510, 512.

To control a polarity of the welding output, the welding power bus 506 may be connected to either of the welding output terminals 510, 512 via a bus terminal 514 and a short cable whip 516. By connecting the whip 516 to one of the terminals 510, 512 and the work cable 42 to the other of the terminals 510, 512, the example power bus 506 may have a corresponding polarity. Regardless of the polarity of the welding output 216 to the torch 14, the preheating output 214 is configured to output the preheating output 214 via the preheating power bus 504 and one of the welding output terminals 510, 512.

Example implementations of the torch terminal 502, the torch connector 508, and power buses of the torch terminal 502 and the torch connector 508 (which may be used to implement the preheating power bus 504 and/or the welding power bus 506) are disclosed in U.S. Pat. No. 9,610,646, issued on Apr. 4, 2017, to Romenesko et al. The entirety of U.S. Pat. No. 9,610,646 is incorporated herein by reference. However, other connectors and/or terminals may be used to transmit the welding current and/or preheating current to the torch 14. In the example of FIG. 5, both the preheating power bus 504 and the welding power bus 506 are coupled to the torch 14 via the torch cable 50.

While the foregoing examples are described with reference to resistively preheating a wire at a welding torch, the disclosed examples may also be used in conjunction with other forms of wire heating, such as inductive heating of the wire, hotwire techniques, arc-based preheating in which an electrical arc is used to apply heat to the wire prior to the welding arc, laser-based preheating, radiant heating, convective heating, and/or any other forms of wire heating.

Figure 6:
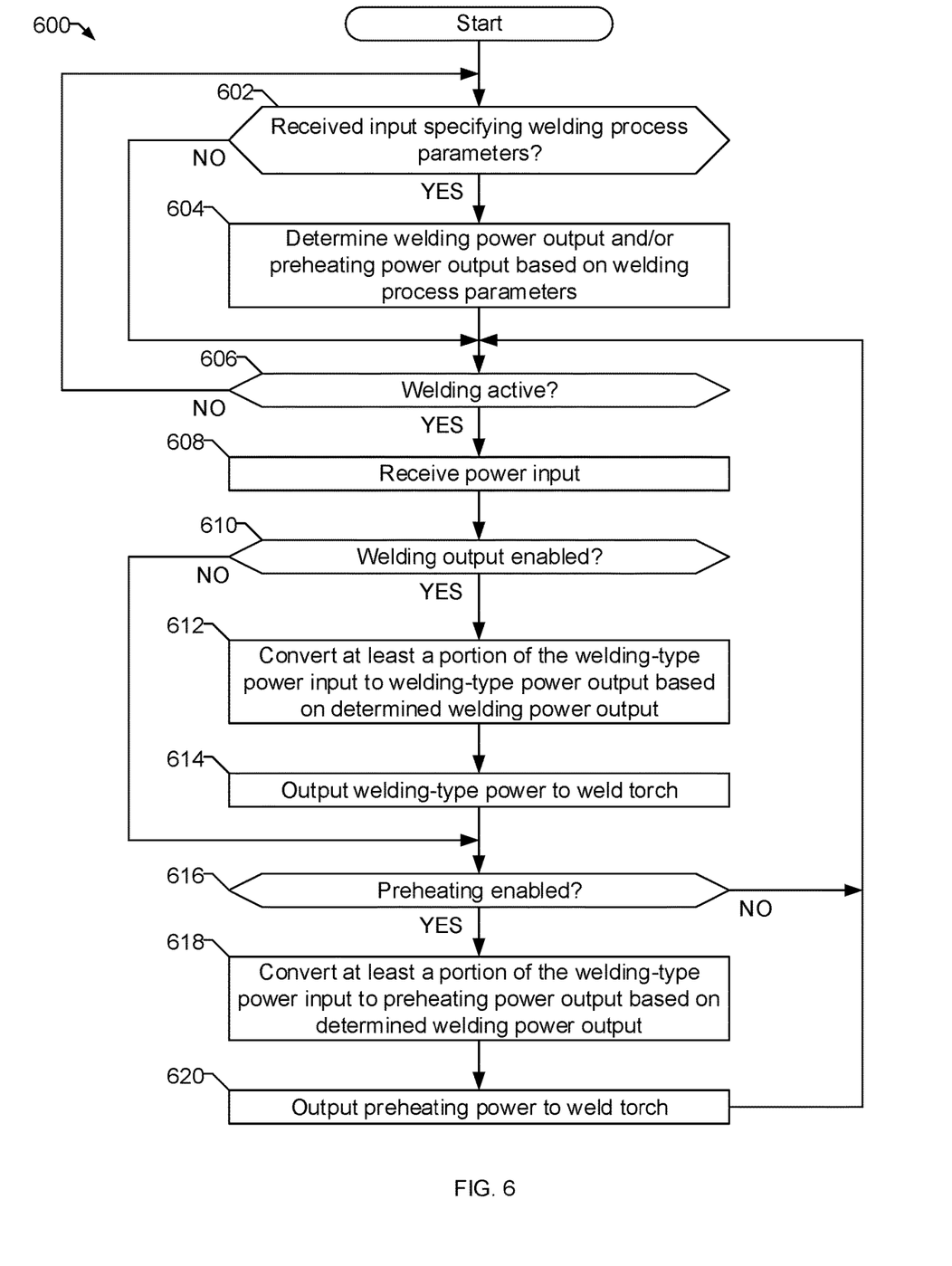
FIG. 6 is a flowchart representative of example machine readable instructions which may be executed by the example welding power supply of FIGS. 1, 3, 4, and/or 5 to convert input power to welding power and preheating power.

FIG. 6 is a flowchart representative of example machine readable instructions which may be executed by the example welding power source of FIGS. 1, 3, 4, and/or 5 to convert input power to welding power and preheating power. The example instructions 600 are described below with reference to the welding power source 12 of FIG. 1, and the example power conversion circuitry 200 of FIG. 2. However, the instructions 600 may be executed using other implementations of the welding power source 12, the power conversion circuitry 30, and/or other welding accessories.

At block 602, the control circuitry 32 determines whether an input specifying welding process parameter(s) has been received. For example, the control circuitry 32 may receive input(s) specifying any one or more of the welding process parameter comprises at least one of a workpiece thickness, a workpiece material, a wire material, a wire type, a wire diameter, a gas type, or a total heat input limit. Additionally or alternatively, the control circuitry 32 may receive welding parameters (e.g., welding voltage, welding current, wire feed speed, pulse parameters, welding gas flow, etc.), preheating parameters (e.g., preheating voltage, preheating current, preheating temperature, preheating resistance, preheating heat input), total heat input, and/or any other parameters as inputs. The control circuitry 32 may receive the inputs via the operator interface 34 of FIG. 1, from an input device on the welding torch 14, via a welding accessory, and/or any other input.

If an input has been received (block 602), at block 604 the control circuitry 32 determines a welding power output and/or a preheating power output based on the received welding process parameters. For example, the control circuitry 32 may determine one or more of a weld voltage, a weld current, a wire feed speed, an inductance, a weld pulse width, a relative pulse amplitude, a wave shape, a preheating voltage, a preheating current, a preheating pulse, a preheating resistance, a preheating energy input, and/or any other welding power parameter and/or preheating power parameter.

After determining the welding power output and/or the preheating power output (block 604), or if no input has been received (block 602), at block 606 the control circuitry 32 determines whether welding is active. For example, the control circuitry 32 may determine whether a trigger is depressed on the welding torch 14 and/or whether welding-type power is available at an input to the power conversion circuitry 30. If welding is not active (block 606), control returns to block 602 to await an input.

When welding is active (block 606), at block 608 the power conversion circuitry 30 receives the power input (e.g., the primary power 22 of FIG. 1). At block 610, the control circuitry 32 determines whether a welding output is enabled (e.g., based on the welding process parameters). If the welding output is enabled (block 610), at block 612 the power conversion circuitry 30 converts at least a portion of the input power to a welding power output based on the determined welding power output. For example, the control circuitry 32 may control the weld power conversion circuitry 204 and/or the boost converter 210 of FIG. 2 to convert the primary power 22 to the welding output 216.

At block 614, the power conversion circuitry 30 outputs the welding output 216 to the weld torch 14. For example, the welding output 216 is conducted to the contact tip 18 and the work cable 42 for generation of the arc 26.

After outputting the welding-type power (block 614), or if the welding output is disabled (block 610), at block 616 the control circuitry 32 determines whether preheating is enabled (e.g., based on the welding process parameters). For example, the control circuitry 32 may selectively enable the preheat power conversion circuitry 202 to provide the preheating output 214 and to selectively disable the preheat power conversion circuitry 202 to stop the preheating output 214. The control circuitry 32 may enable and/or disable the preheating based on, for example, a user input via the operator interface 34, and/or an input from the power source, a remote control, and/or the welding torch 14.

If the preheating output is enabled (block 616), at block 618 the power conversion circuitry 30 converts at least a portion of the input power to a preheating power output based on the determined preheating power output. For example, the control circuitry 32 may control the preheat power conversion circuitry 202 and/or the boost converter 210 of FIG. 2 to convert the primary power 22 to the preheating output 214.

At block 620, the power conversion circuitry 30 outputs the welding-type power to the weld torch 14. For example, the preheating output 314 is conducted to the contact tip 18 and the contact tip 20 via the conductors 102, 104.

After outputting the preheating power (block 620), or if the preheating is disabled (block 616), control returns to block 606 to determine whether welding is still active.

Figure 7:
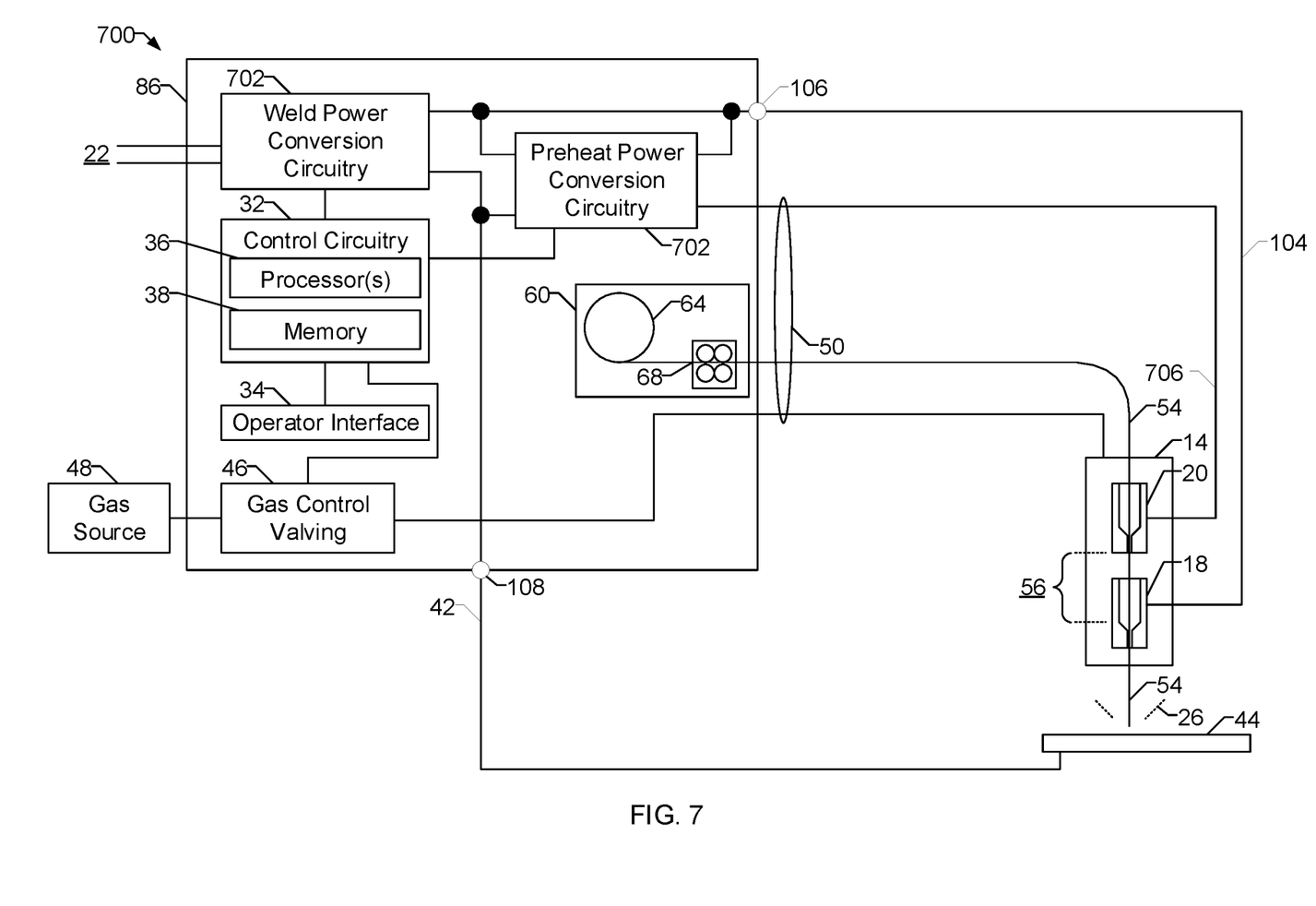
FIG. 7 illustrates another example welding power supply configured to convert input power to welding power and preheating power, in accordance with aspects of this disclosure.

FIG. 7 illustrates another example welding power supply 700 configured to convert input power (e.g., the primary power 22 of FIG. 1) to welding power and preheating power. The example welding power source 700 includes the control circuitry 32, the operator interface 34, the processor(s) 36, the memory 38, the gas control valving 46, the housing 86, and the terminals 106, 108. The example power supply 700 receives primary power 22 as input power.

Instead of the power conversion circuitry 30 that converts the primary power 22 to both the preheating output 214 and the welding output 216, the example welding power supply 700 includes weld power conversion circuitry 702 and preheat power conversion circuitry 704. The weld power conversion circuitry 702 receives the primary power 22 and converts the primary power 22 to a welding output (e.g., the welding output 216) based on the setpoints determined by the control circuitry 32. The weld power conversion circuitry 702 may be similar, identical, or different than the weld power conversion circuitry 204 of FIG. 2. As an example, the weld power conversion circuitry 702 may include the rectifier 206, the boost converter 210, and the weld power conversion circuitry 204. In other examples, the weld power conversion circuitry 702 may include any other appropriate topology. The weld power conversion circuitry 702 outputs the welding output power to the terminals 106, 108.

The example preheat power conversion circuitry 704 obtains input power from the welding output of the weld power conversion circuitry 702 (e.g., from the connections to the terminals 106, 108. The preheat power conversion circuitry 704 converts a portion of the welding power to a preheating output (e.g., the preheating output 214), while the remaining welding power may be output to the torch 14 and/or to the wire feed assembly 60. The preheat power conversion circuitry 704 may be similar, identical, or different than the preheat power conversion circuitry 202 of FIG. 2. As an example, the preheat power conversion circuitry 704 may include the rectifier 206, the boost converter 210, and the preheat power conversion circuitry 202. In other examples, the preheat power conversion circuitry 704 may include any other appropriate topology. The preheat power conversion circuitry 704 outputs the welding preheating power to the torch 14 and/or to another preheater (e.g., a preheater similar to the preheater 304 of FIG. 3). For example, the preheat power conversion circuitry 704 may output the welding preheating power via a conductor 706 in the torch cable 50 and via the terminal 106.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

An example control circuit implementation may be a microcontroller, a field programmable logic circuit and/or any other control or logic circuit capable of executing instructions that executes weld control software. The control circuit could also be implemented in analog circuits and/or a combination of digital and analog circuitry.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding power supply, comprising:
   a power input configured to receive alternating current (AC) input power; and
   power conversion circuitry configured to:
   convert a first portion of the input power to welding power;
   output the welding power to a weld circuit;
   convert a second portion of the input power to preheating power; and
   output the preheating power to a preheater, wherein the power conversion circuitry comprises:
   first power conversion circuitry configured to convert the first portion of the input power to the welding power and output the welding power to the weld circuit; and
   second power conversion circuitry configured to convert the second portion of the input power to the preheating power and output the preheating power to the preheater.

2. The welding power supply as defined in claim 1, further comprising:
   a rectifier configured to rectify the AC input power; and
   a preregulator circuit configured to convert the rectified AC input power to intermediate power, wherein the first portion and the second portion of the input power are received at the power conversion circuitry as the intermediate power.

3. The welding power supply as defined in claim 1, wherein the first power conversion circuitry comprises a first power converter and a first transformer, and the second power conversion circuitry comprises a second power converter and a second transformer.

4. A welding power supply as defined in claim 1, comprising:
   a power input configured to receive alternating current (AC) input power; and
   power conversion circuitry configured to:
   convert a first portion of the input power to welding power;
   output the welding power to a weld circuit;
   convert a second portion of the input power to preheating power; and
   output the preheating power to a preheater, wherein the power conversion circuitry comprises:
   a rectifier configured to convert the AC input power to a first DC bus having a first DC voltage;
   first power conversion circuitry configured to convert the first DC voltage to a second DC voltage;
   second power conversion circuitry configured to convert the second DC voltage to the welding power via at least a first inverter and a first transformer, and to output the welding power to the weld circuit; and
   third power conversion circuitry configured to convert the second DC voltage to the preheating power via at least a second inverter and a second transformer, and to output the preheating power to the preheater.

5. The welding power supply as defined in claim 1, further comprising a first connector configured to output the welding power and a second connector configured to output the preheating power.

6. The welding power supply as defined in claim 5, further comprising a third connector configured to conduct at least one of the welding power or the preheating power.

7. The welding power supply as defined in claim 1, further comprising:
    first and second terminals to output the welding power; and
    a wire feed assembly comprising a contact element configured to be part of the preheater and to conduct the preheating power to an electrode wire fed by the wire feeder.

8. The welding power supply as defined in claim 7, wherein the contact element comprises at least one of a feed roller or an idle roller.

9. A welding power supply, comprising:
    a power input configured to receive alternating current (AC) input power;
    power conversion circuitry configured to:
        convert a first portion of the input power to welding power;
        output the welding power to a weld circuit;
        convert a second portion of the input power to preheating power; and
        output the preheating power to a preheater;
    first and second weld terminals configure to output the welding power; and
    a wire feed assembly, comprising:
        a feed roller configured to feed the electrode wire to a third terminal connected to the welding power supply;
        a first power bus configured to be electrically coupled to a second power bus of the third terminal when the third terminal is connected to the welding power supply, the power conversion circuitry configured to output the preheating power via the first power bus and via the first weld terminal or the second weld terminal; and
        a third power bus configured to be electrically coupled to a fourth power bus of the third terminal when the third terminal is connected to the welding power supply, the wire feed assembly configured to couple the first weld terminal or the second weld terminal to the third power bus to enable output of the weld power to the weld circuit.

10. The welding power supply as defined in claim 1, wherein the power conversion circuitry comprises a plurality of switched mode power supplies.

11. The welding power supply as defined in claim 1, wherein the preheater comprises at least one of: a preheating circuit including a portion of an electrode wire located between a first contact point and a second contact point; an induction coil configured to heat the electrode wire; a tungsten electrode configured to establish an arc to the electrode wire; a laser configured to output energy to the electrode wire; a heating coil configured to heat the electrode wire via radiation; or a convective heating material configured to contact the electrode wire to transfer heat to the electrode wire.

12. The welding power supply as defined in claim 1, further comprising control circuitry configured to control the power conversion circuitry to convert the first portion of the input power and the second portion of the input power.

13. The welding power supply as defined in claim 12, wherein the control circuitry is configured to determine at least one of the welding power to be output by the power conversion circuitry or the preheating power to be output by the power conversion circuitry based on a welding process parameter.

14. The welding power supply as defined in claim 13, wherein the welding process parameter comprises at least one of a workpiece thickness, a workpiece material, a wire material, a wire type, a wire diameter, a gas type, or a total heat input limit.

15. The welding power supply as defined in claim 13, wherein the control circuitry is configured to determine at least one of a weld voltage, a weld current, a wire feed speed, an inductance, a weld pulse width, a relative pulse amplitude, a wave shape, a preheating voltage, a preheating current, a preheating pulse, a preheating resistance, or a preheating energy input based on the welding process parameter.

* * * * *